United States Patent [19]

Riesmeyer

[11] Patent Number: 4,809,322
[45] Date of Patent: Feb. 28, 1989

[54] CIRCUIT ARRANGEMENT FOR A TELEPHONE STATION WITH GROUND CONNECTION

[75] Inventor: Juergen Riesmeyer, Olching, Fed. Rep. of Germany

[73] Assignee: Siemens Aktiengesellschaft, Berlin and Munich, Fed. Rep. of Germany

[21] Appl. No.: 161,728

[22] Filed: Feb. 29, 1988

[30] Foreign Application Priority Data

Mar. 24, 1987 [DE] Fed. Rep. of Germany ....... 3709538

[51] Int. Cl.⁴ ............................................. H04M 1/00
[52] U.S. Cl. ...................................... 379/380; 379/387
[58] Field of Search ............... 379/380, 382, 377, 352, 379/387, 258, 362

[56] References Cited

U.S. PATENT DOCUMENTS 4,319,092  3/1982  Van den Enden et al. ........ 379/380
4,614,843  9/1986  Coulmance ..................... 379/377 X Primary Examiner—James L. Dwyer
Attorney, Agent, or Firm—Hill, Van Santen, Steadman & Simpson

[57] ABSTRACT

The invention relates to a circuit arrangement for a telephone station with ground connection to a central supply device for the purpose of post-dialling signalling. The circuit arrangement operates independently of which terminal of an exchange battery in the central supply device is connected to ground. A second polarity reversal protection device (rectifier bridge) is used as an indicator of the polarity of the exchange battery, so that, dependent upon the polarity, different grounding paths are formed in the telephone station. The circuit arrangement is universally suitable for PBX exchanges.

3 Claims, 1 Drawing Sheet

Dialling and Speech Circuit

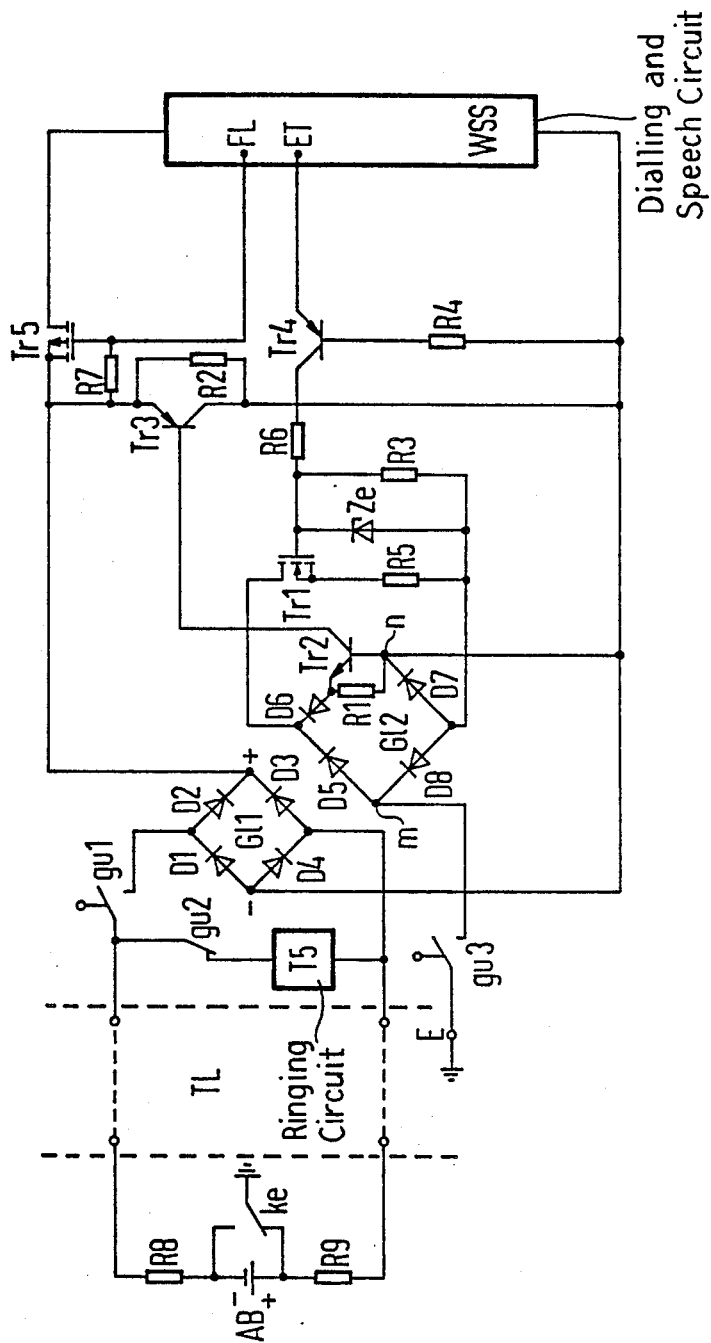

CIRCUIT ARRANGEMENT FOR A TELEPHONE STATION WITH GROUND CONNECTION

BACKGROUND OF THE INVENTION

The invention relates to a circuit arrangement for a telephone station with ground connection to a central supply device for post-dialling signalling, where the telephone station utilizes a dialling and speech circuit with pulse circuit and a first polarity reversal protection device.

A central telephone exchange requires, for example, for post-dialling signals, (consultation etc.), a signalling mode which is in addition to the normal dialling information. It is dependent upon the central telephone exchange whether signalling must take place by a pulse (loop interruption) or by grounding the ungrounded terminal of the central supply device. Grounding or pulse are triggered by the same key. A circuit arrangement has already been proposed wherein the telephone station is automatically switched over to pulse function or ground signalling in dependence upon the central exchange. If a ground signal is required, ground is connected to the ground terminal point of the telephone station. If no ground is connected, a pulse function automatically exists. However, the circuit arrangement operates in the aforementioned manner only when, in the event that a ground signal is required, the positive terminal of the central supply device is grounded.

SUMMARY OF THE INVENTION

Thus, the aim of the present invention is to provide a circuit arrangement of the aforementioned type in which the earth signalling is additionally independent upon the type of the earthed pole in the central supply device. The telephone station is a microprocessor controlled station.

This is achieved in that the telephone station is assigned a second polarity reversal protection device, a first input of which is connected via a hybrid switch-over contact to a ground terminal point, and a second input of which is connected to a negative output of a first polarity reversal protection device. The two outputs of the second polarity reversal protection device are connected via the drain-source path of a field effect transistor, the gate of which is controlled by the function of a ground key. A biasing resistor is located between the second input and a diode, poled from this point in the current flow direction, of the second polarity reversal protection device, and is arranged in parallel to the base-emitter path of a NPN-transistor whose collector is connected to the base of a PNP-transistor. The collector-emitter path of the PNP-transistor is connected to the outputs of the first polarity reversal protection device and is bridged by an ignition resistor.

This results in the advantage that when ground signalling is required, and when the positive terminal of the central supply device is grounded the negative terminal is always grounded, and when the negative terminal of the central supply device is grounded, the positive terminal is always grounded. When the ground is disconnected at the telephone station, pulse signalling also takes place automatically.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

The single FIGURE is a circuit schematic of the present invention.

DESCRIPTION OF THE PREFERRED EMBODIMENT

The FIGURE shows the central supply device having an exchange battery AB, supply resistors R8 and R9, and a grounding contact ke. The figure also shows a subscriber line TL, a ringing circuit T5, hybrid switch-over contacts gu1, gu3, a first polarity reversal protection device G11 having diodes D1 to D4, a second polarity reversal protection device G12 having diodes D5 to D8, and having a first input m and a second input n, resistor R1 and transistor Tr2, a microprocessor controlled dialling and speech circuit WSS, transistors Tr1 and Tr3 to Tr5, Zener diode Ze and resistors R2 to R7.

The aforementioned FIGURE represents an operating situation in which ground signalling is required by the central telephone exchange The positive terminal of the exchange battery AB is shown grounded in the FIGURE If ground signalling is to take place from the telephone station, when the latter has been triggered by the operator via the terminal points FL and ET in the dialling and speech circuit WSS, a control signal to form a pulse is transmitted to the gate of the field effect transistor Tr5 and a positive control signal to ground the negative terminal of the exchange battery is transmitted to the emitter of the transistor Tr4 by the electronics unit of the dialling and speech circuit WSS. The field effect transistor Tr5 thereby disconnects the positive supply input of the speech circuit WSS and thus interrupts the telephone wire which is supplied with positive supply potential by the first polarity reversal protection device G11. The transistor Tr4 renders the field effect transistor Tr1 conductive via the resistor R6, so that now, for the grounding of the negative terminal of the exchange battery AB, the following ground path exists: ground, E, gu3, m, D5(G12), Tr1, R5, D7, n, D1, (G11), gu1, R8, ABC(−). (Handset lifted, ringing circuit T5 disconnected). Thus in this case, independently of the polarity of the subscriber line FL, the negative terminal of the exchange battery AB is always grounded. The transistors Tr2 and Tr3 remain nonconductive. The pulse function of the field effect transistor Tr5 remains inactive. However, this transistor advantageously disconnects the dialling and speech circuit WSS so that no spurious currents can flow therein.

If the contact ke is switched in such manner that the negative terminal of the exchange battery AB is grounded, and if a ground signal is required as a post-dialling signal, when ground is connected to terminal E, and a control signal is emitted to FL and ET, the following ground path for the grounding of the positive terminal of the exchange battery AB occurs: ground, E, gu3, m, D8(G12), Tr1, D6 (G12), Tr2, n, R2, D3(G11), R9, AB(+).

Here again the field effect transistor Tr1 is rendered conductive by a control potential via Tr4 and RG, and a base current flows across Tr2. The transistors Tr2 and Tr3 cooperate in the manner of a thyristor, where R2 serves as ignition resistor. If the transistor Tr3 has been switched conductive, ground is thus connected in low-ohmic fashion to the positive terminal of the exchange battery AB, and the dialling and speech circuit is short-circuited. The following ground path now exists: ground, E, gu3, m, D8(G12), Tr1, D6(G12), Tr2, n, Tr3, D3(G11), R9, AB(+). If the transmission of the pulse signal from FL were delayed relative to the ground signal from ET, the ignition resistor R2 could be dispensed with as then the dialling and speech circuit would serve as the ignition resistor.

If a pulse signal were required as a post-dialling signal for the telephone exchange, no ground would be connected to terminal E. The ground paths would remain inactive, while the interruption of the positive telephone wire by the field effect transistor for the duration of the signal from FL represents the pulse signal.

The resistors R1, R3, R4, R5 and R7 additionally shown in the FIGURE are biasing resistors and are intended simply to clarify the drawing. The Zener diode Ze has a voltage limiting function.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for a telephone station with a ground connection to a central supply device for the purpose of post-dialling signalling, whereby the telephone station has a dialling and speech circuit with pulse circuit and a first polarity reversal protection device, comprising the telephone station having a second polarity reversal protection device whose first input is connected via a hybrid switch-over contact to a ground terminal point and whose second input is connected to a negative output of the first polarity reversal protection device, two outputs of the second polarity reversal protection device being connected via a drain-source path of a field effect transistor, a gate of which is controlled by the function of a ground key, a bias resistor connected between the second input and a diode, poled from this point in the current flow direction, of the second polarity reversal protection device and connected in parallel with the base-emitter path of a NPN-transistor, whose collector is connected to a base of a PNP-transistor, and a collector-emitter path of the PNP-transistor being connected to the negative output of the first polarity reversal protection device and being bridged by an ignition resistor.

2. A circuit arrangement for a telephone station with a ground connection and connected to a central supply device for the purpose of post-dialling signalling, the telephone station having a dialling and speech circuit with pulse circuitry and a first polarity reversal protection device having a negative output comprising:

a second polarity reversal protection device having a first input connected via a hybrid switch-over contact to a ground terminal point and having a second input connected to the negative output of the first polarity reversal protection device, and having two outputs connected via a drain-source path of a field effect transistor, a gate of which is controlled by a control signal from the dialling and speech circuit;

a resistor connected between the second input and a diode in the second polarity reversal protection device, the diode poled in the direction of current flow, the resistor also connected in parallel with the base-emitter path of a NPN-transistor, a collector of which is connected to a base of a PNP-transistor, a collector-emitter path of the PNP-transistor connected to the negative output of the first polarity reversal protection device; and an ignition resistor connected across the collector emitter path of the PNP-transistor.

3. The circuit arrangement according to claim 2, wherein said second polarity reversal protection device is a bridge rectifier.

* * * * *